US009148424B1

(12) United States Patent
Yang

(10) Patent No.: US 9,148,424 B1
(45) Date of Patent: Sep. 29, 2015

(54) SYSTEMS AND METHODS FOR IP-BASED INTRUSION DETECTION

(71) Applicant: Snapchat, Inc., Venice, CA (US)

(72) Inventor: Jinlin Yang, Venice, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/657,739

(22) Filed: Mar. 13, 2015

(51) Int. Cl.
*G06F 7/04* (2006.01)
*H04L 29/06* (2006.01)
(52) U.S. Cl.
CPC .................................... *H04L 63/083* (2013.01)
(58) Field of Classification Search
USPC ................. 713/182; 726/18, 19, 27
See application file for complete search history.

Primary Examiner — Christopher Brown
(74) Attorney, Agent, or Firm — Schwegman Lundberg & Woessner, P.A.

(57) ABSTRACT

Systems and methods for account security are provided. In one example embodiment, a first login request including a username and a password is analyzed to identify a first internet protocol (IP) address and a first request time associated with the first login request. A login history comprising login request data for the server computer is analyzed to identify a plurality of usernames, wherein each username of the plurality of usernames is associated with a corresponding login request from the first IP address within a threshold time period of the first request time. In response to determining a login success ratio is below a threshold login success ratio and a number of unique usernames in the analyzed data is above the unique username threshold, the system automatically performs a security action.

19 Claims, 7 Drawing Sheets

SYSTEMS AND METHODS FOR IP-BASED INTRUSION DETECTION

TECHNICAL FIELD

Embodiments of the present disclosure relate generally to security systems, and more particularly, but not by way of limitation, to systems and methods for Internet Protocol (IP)-based intrusion detection and security responses.

BACKGROUND

Security in network technologies is an important concern for many systems. Username and secret password pairs are a standard form of authentication in significant numbers of systems. When a user's login username and password combination are compromised, many systems are not able to distinguish unauthorized system intrusions from standard acceptable system use by an authorized user.

BRIEF DESCRIPTION OF THE DRAWINGS

Various ones of the appended drawings merely illustrate example embodiments of the present disclosure and should not be considered as limiting its scope.

Figure 1:
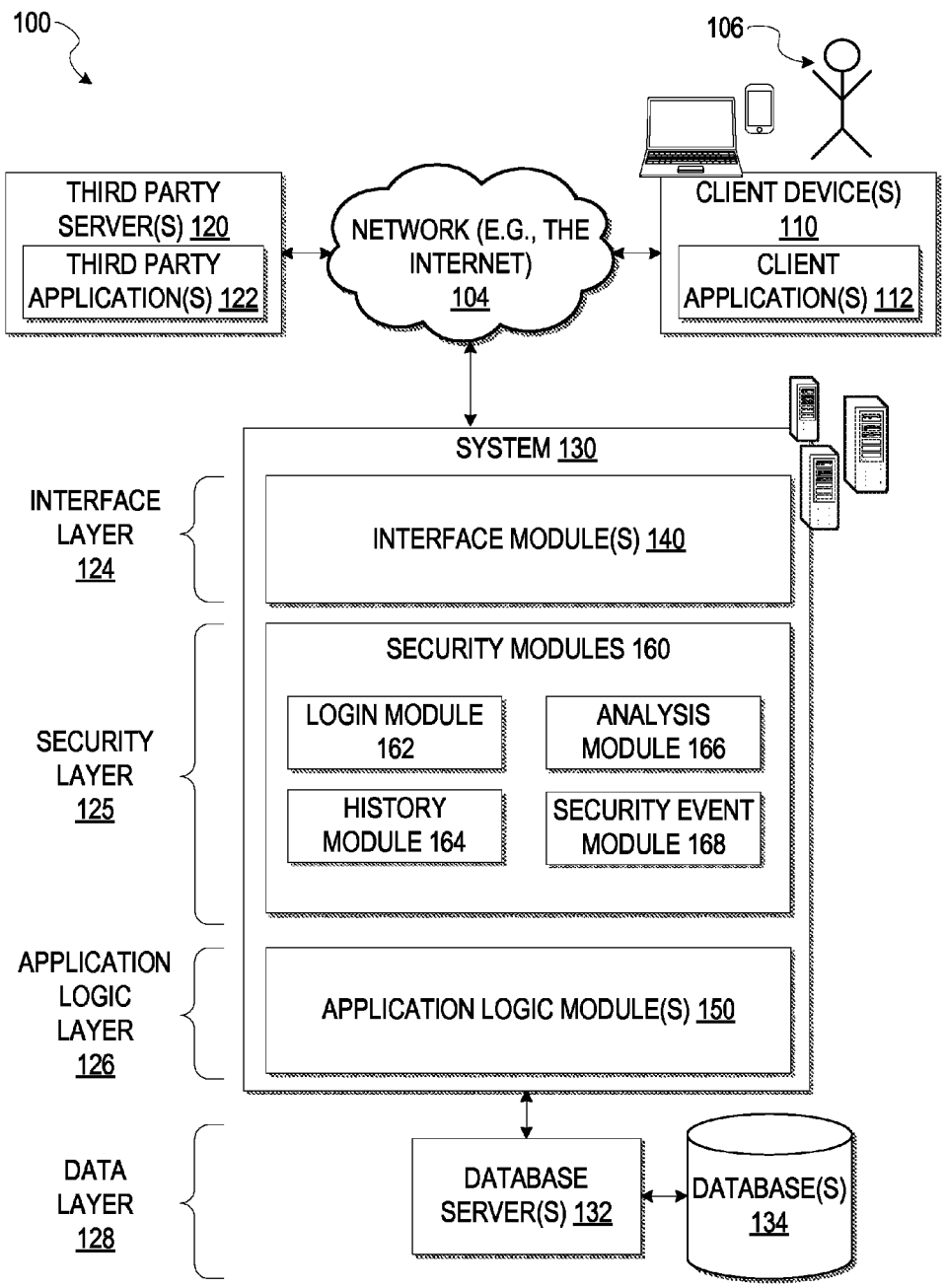
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein are related to IP-based intrusion detection. The Internet Protocol is a communications protocol for relaying data between devices in a network, and includes routing functionality based on device IP addresses. An IP address is a numerical label assigned to a device participating in a computer network that uses the Internet Protocol.

Many online services such as social network services, allow users to create accounts. Login credentials for an online account may consist of a username and password, or may consist of other authenticating data for a user. In certain network intrusion scenarios, a potential intruder gains access to, for example, a significant number of usernames and the associated passwords. This may occur when information from a login database or history for a first system is compromised. Because many users reuse usernames and associated passwords for multiple systems, when one system is compromised, the information gathered by the potential intruder may be useful for infiltrating another system. While the percentage of username-password pairs across systems may be small, for systems with large numbers of users, the total number of accounts that may be compromised is still significant. For example, if a data theft from a banking system steals 200,000 username and password combinations, and five percent of those username and password combinations were reused by the banking system users in a social media system, then the intruder has 10,000 compromised accounts for the social media system. In order to determine which of the 200,000 username and password combinations work in the social media system, however, the intruder will need to attempt to use all 200,000 combinations in a login process with the social media system to see which combinations work. Because of the volume of data associated with such large numbers of username-password pairs, an automated intruding device may be used to attempt a login with many different username-password pairs, with the device configured to identify the successful logins.

In comparison with other intrusion methods, for example a brute force method where many different passwords are attempted with a single username, aspects of the intrusion described above may be difficult for a security system to identify. This is particularly true for the first several username and password attempts by the automated intruding device, because the device is not repeating login attempts for a single username, and is therefore difficult to distinguish from an authorized login by a user that created a particular username and password.

Further adding to the complexity of identifying intrusions in such circumstances is the situation in which an authorized user will attempt to use different usernames in a system. This may occur, for example, with a user who uses different usernames in different systems, and cannot remember which username was used with the system that the user is currently attempting to access. Security systems which flag such authorized users as potential intruders may cause problems with such a user by incorrectly flagging the user's account and requiring time-consuming actions from the authorized user. Embodiments described herein provide system security benefits related to such intrusion scenarios by identifying intrusions while limiting the false positives associated with authorized users.

Certain embodiments described herein include security operations that function to identify an IP address that attackers use to try large numbers of stolen login credentials, and that further functions to detect compromised accounts and take security actions to prevent further malicious activities in compromised accounts. In one example, a security system receives a username and password as part of a login request from a first IP address. The security system then checks a login history for other login requests from that same first IP address that have been received within a certain time period, for example, 30 minutes, 2 hours, or another such time period. The system identifies the total number of login requests from the IP address during the time period, and compares that with a threshold number of requests. If the number of requests is above the threshold number of requests, then the security system calculates an overall success ratio for the login requests from the first IP address during the time period and checks to see if the overall success ratio is below a threshold success ratio value. Additionally, the security system checks the number of distinct usernames associated with the total number of login requests to verify that the number of usernames is above a username threshold. This may include filtering for username typos by considering usernames that are sufficiently similar as a single username for purposes of username threshold comparison.

In the above example embodiment, if these three threshold tests related to: (1) a total number of login requests; (2) an login success ratio; and (3) a number of usernames are each met, then the security system automatically initiates a security action. Such security actions may include blocking access to all accounts associated with a username and password login attempted during the time period, forcing a password reset via an e-mail for each such account, sending a notice of suspected intrusion, or other such security actions. As described above, certain embodiments operate in environments where multiple successful intrusion account operations occur prior to the system recognizing an intrusion. Thus, an analysis identifying an intrusion following a certain login request may initiate security actions for multiple different accounts, particularly different accounts accessed from a single IP address within a threshold time period, including, e.g., accounts utilized prior to the determination of an intrusion.

In various other embodiments, other security information, such as IP address location details, account activity following login, device usage history, or other such information, may be integrated with the above IP-based intrusion analysis for security event determination and to avoid false positives. As each login request is received, details associated with each login request are stored in a login history database.

FIG. 1 is a network diagram depicting a network system 100 having a client-server architecture configured for exchanging data over a network, and use of IP-based intrusion detection, according to one embodiment. For example, the network system 100 may be a messaging system where clients may communicate and exchange data within the network system 100. The data may pertain to various functions and aspects associated with the network system 100 and its users. Although illustrated herein as a client-server architecture, other embodiments may include other network architectures.

As shown in FIG. 1, the network system 100 may include a system 130. The system 130 is generally based on a multi-tiered architecture, consisting of an interface layer 124, a security layer 125, an application logic layer 126, and a data layer 128. In various alternate embodiments, the security layer 125 may be implemented as a separate device that communicates with interface layer 124 to implement all or part of login security for a system 130. In other embodiments, security layer 125 may be integrated with interface layer 124, or other various layers or modules may be integrated in different ways. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. Such requests include login requests as part of system security and user authentication processes. Such requests also include application use following a successful user login. In response to received requests, the interface module(s) 140 communicates appropriate responses to requesting devices via a network 104. For example, the interface module(s) 140 can receive requests such as Hypertext Transfer Protocol (HTTP) requests, or other web-based, application programming interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the system 130. Each of the client device(s) 110 can comprise a computing device that includes at least a display and communication capabilities with the network 104 to access the system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more user(s) 106 can be a person, a machine, or other means of interacting with the client device(s) 110. In some embodiments, the user(s) 106 interact with the system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the system 130), and other user data.

An individual can register with the system 130 to become a member of the system 130. Such registration may include selection of a text based username and a password. Alternative embodiments may use other authentication data, such as image, biometric user data, encryption data, or other such login request data. While certain embodiments herein are described with respect to text based username and password authentication systems, any embodiment may use any other such authentication information. Once registered, a member can access the system 130 and interact with a broad range of applications provided by the system 130 in various different embodiments.

Such login processes may use security modules 160. Information set during registration may be used by login module 162 for authentication of a client device 110 or client application 112 that sends a login request to system 130. On receipt of such a login request via interface 140, login module 162 may access analysis module 166 to perform IP-based intrusion detection in accordance with various embodiments. Analysis module 166 may access history module 164 for data related to previous login requests as part of a security analysis triggered by a login. If a security event is identified by analysis module 166, then security event module 168 may handle the resulting security event. Additional details related to security systems and IP-based intrusion detection that may be performed by various implementations of a security module 160 are described in more detail below with respect to FIGS. 2-5.

The application logic layer 126 includes various application logic module(s) 150, which, in conjunction with the interface module(s) 140, generate various user interfaces with data retrieved from various data sources or data services in the data layer 128. Additionally, client device 110 or client application 112 interactions with application logic modules 150 may be logged and stored in a history module 164 along with any interface module 140 or any other module interactions for later use by an analysis module 166 or any other module of security modules 160.

Individual application logic module(s) 150 may be used to implement the functionality associated with various applications, services, and features of the system 130, and to provide network based server support for various client applications 112. Any applications 610 within architecture 602 of FIG. 6 may include modules both within a client device 110 and a system 130 as part of client-server operation. For instance, a social messaging application can be implemented with one or more of the application logic module(s) 150. The social messaging application provides a messaging mechanism for users 106 of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications 610 and services may be separately embodied in their own application server module(s) 150.

Figure 2:
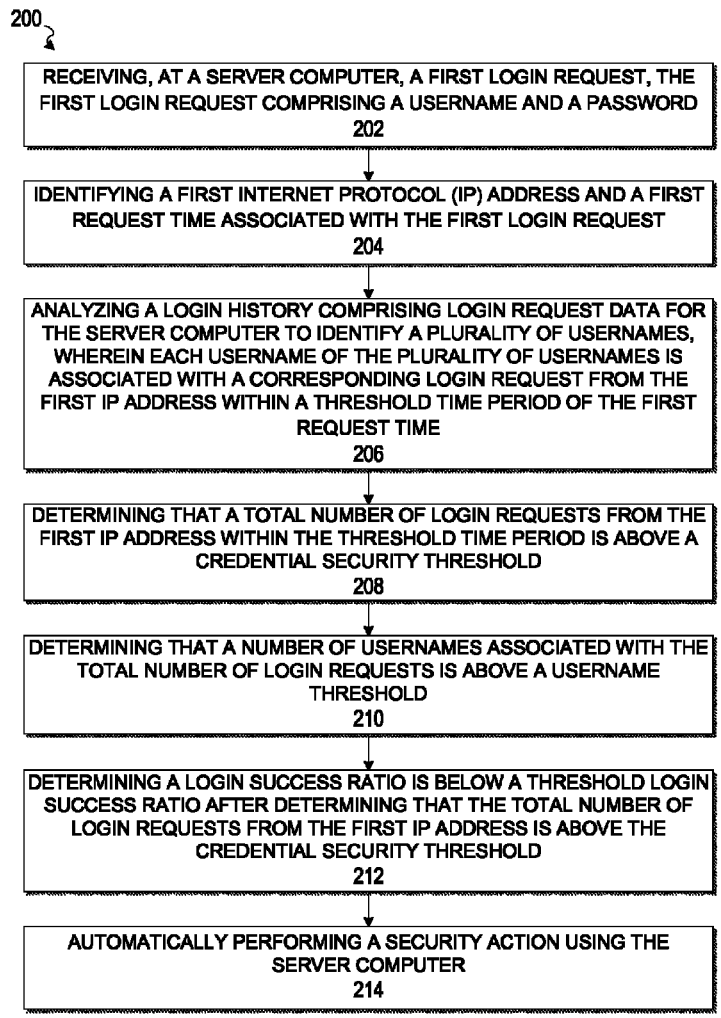
FIG. 2 is a diagram illustrating a method for IP-based intrusion detection, according to some example embodiments.

FIG. 2 then illustrates one embodiment of a method for IP-based intrusion detection, shown as method 200. For the purposes of illustration, method 200 is described here within the context of network system 100 of FIG. 1. It will be apparent that method 200 may be implemented with other systems or devices in other embodiments.

Method 200 begins with operation 202 receiving, at a server computer, a first login request, the first login request comprising a username and a password. The server computer may be a device implementing security module(s) 160 of system 130 that receives the login request in a relay communication from a separate server computer implementing interface modules 140 which receives the login request from a client device 110. In other embodiments, system 130 may be operating on a single server computer, or various other implementations may be used. As described above, the username and password may be text strings, with a public username paired with a secret or encrypted password. In other embodiments, the username and password may be a single set of more complex data, such as biometric data, keycode data, or other such data that may be sent from a client device 110 as part of a login authentication. A username and password, as described herein, refers to the use of any such data in any combination as part of a login request.

Operation 204 then involves identifying a first IP address and a first request time associated with the first login request. The first request time may be part of the login request communication received in operation 202, or may be generated using a clock of system 130. The first IP address may be identified using a text parser to parse information from a transmission control protocol (TCP) IP or user datagram protocol (UDP) IP communication used to transmit the login request. In certain embodiments, such parsing may be performed by an analysis module 166. In other embodiments, the IP address may be identified in an interface module 140 and sent to a security module 160 along with the username and password data.

In operation 206, the analysis module 166 uses the identified time at which the login request is received to request history data from history module 164. The login request data may be used with the history data in analyzing a login history comprising login request data for the server computer to identify a plurality of usernames, wherein each username of the plurality of usernames is associated with a corresponding login request from the first IP address within a threshold time period of the first request time. In certain embodiments, no previous login requests from the first IP address will have occurred within the threshold time period. In other embodiments, hundreds, thousands, or more login requests may have been received from the first IP address within the threshold time period.

Once analysis module 166 gathers the relevant previous login history data from history module 164 in operation 206, operation 208 then involves using this information with the information from the login request in determining that a total number of login requests from the first IP address within the threshold time period is above a credential security threshold. The credential security threshold may be a value set by system 130 design, by an adjustable value of system 130 settings, or by an automated system that may use feedback from false positives and false negatives identified later to update the threshold value in a feedback loop. In certain embodiments, the threshold value is selected to prevent IP addresses shared by multiple users 106 or repeated login attempts from one or more users 106 attempting to remember a password from generating excessive numbers of false positives.

Operation 210 then involves determining that a number of usernames associated with the total number of login requests is above a username threshold. Such a username threshold prevents typos of attempts by a user 106 to log-in with multiple similar usernames from triggering a false positive security event. In certain embodiments, multiple failed login attempts may occur with different but very similar usernames. To eliminate false positives from such occurrences, an edit distance metric may be used to identify characters within an edit distance of each other with a single login name and/or login request. In certain embodiments, the edit distance metric is simply an edit distance that is the number of characters or data units that need to be added, deleted, or changed in one username in order to transform this username into a second username. Each pair of usernames that are sufficiently similar or below an edit distance threshold may be considered one username. Comparing the total number of login requests to the number of distinctive usernames used within the time period may thus be used as a filter to avoid false positives.

In other embodiments, an overall analysis of usernames within a threshold time period may be used as such a filter to determine whether an intrusion should be identified based on an analysis of all usernames together. Such an embodiment may implement an edit distance analysis as follows: (A) given N login requests that are ordered by timestamps, compute $$\text{TotalEditDistance} = \text{SUM}(\text{edit distance of username } i \text{ and username } i+1) \text{ for } i=1 \text{ to } N-1 \quad (1)$$

and $$\text{TotalUsernameLength} = \text{SUM}(\text{length of username } i) \text{ for } i=1 \text{ to } N \quad (2)$$

where N is the total number of login requests from the same IP address within a threshold time period. An edit distance ratio is then $$\text{TotalEditDistanceRatio} = \text{TotalEditDistance}/\text{TotalUsernameLength}. \quad (3)$$

This TotalEditDistanceRatio represents the similarity or difference between usernames in the login requests from the same IP address during a threshold time period. The system will use a ratio threshold to block an IP address for future logins as a security event if all the login attempts have substantially different usernames. Different embodiments may analyze similarities between usernames in different ways. Certain embodiments may not identify a security event when similar usernames are used within a time period, since the embodiments are weighted towards identifying intrusions based on theft of actual username-password pairs from a third party source where usernames are unlikely to be similar.

Operation 212 then involves determining that a login success ratio is below a threshold login success ratio after determining that the total number of login requests from the first IP address is above the credential security threshold. As described above, certain embodiments target theft of data from third party sources, where the correlation of users 106 to a currently attacked system 130 is low. If the correlation is high and a significant percentage of compromised usernames and passwords from the third party source have associated accounts in system 130, then the intrusion may not be distinguishable based purely on IP analysis with the above method. Such intrusions may, in such embodiments, require excessive numbers of false positives if they are flagged as security events. Identifying a low login success ratio prevents such false positives.

Operation 214 then involves, in response to determining the login success ratio is below the threshold login success ratio and determining, using analysis module 166, that the number of unique usernames is above the unique username threshold, automatically performing a security action using security event module 168.

In various embodiments, the decision to take an automatic security action may be arrived at using various combinations of the above elements in different orders or using different data elements. One example embodiment may determine that a security action is automatically taken when the following is a true statement:

$$[\text{Login Success Ratio} < X] \text{ AND } [\text{Unique User Login Failures} > Y] \text{ AND } [\text{Edit Distance Ratio} > Z] \quad (4)$$

where the login success ratio is determined using any method described above and the unique user login failures is an absolute number of distinct logins with the distinct logins identified using the edit distance ratio threshold Z. The threshold values X, Y, and Z may be determined by an operator selection, using training data, using a feedback system during operation to identify initial values and update the values during operation, or using any combination of these along with any other such threshold selection operation.

In certain embodiments, the above combination of operations may serve as a baseline for identifying intrusion attacks using login information stolen from third party sources. Such embodiments may also avoid false positives that may occur, for example in certain local networks that provide a single IP address for all devices within the network 104, with the local network 104 managing communications to individual devices. In such embodiments, a system may see significant numbers of login requests with unique usernames from the same IP address, but with a high percentage of successful logins. Such operations may additionally avoid false positives where users 106 in such an environment enter incorrect login information based on an attempt to remember usernames or passwords that are sufficiently similar to each other.

Figure 3:
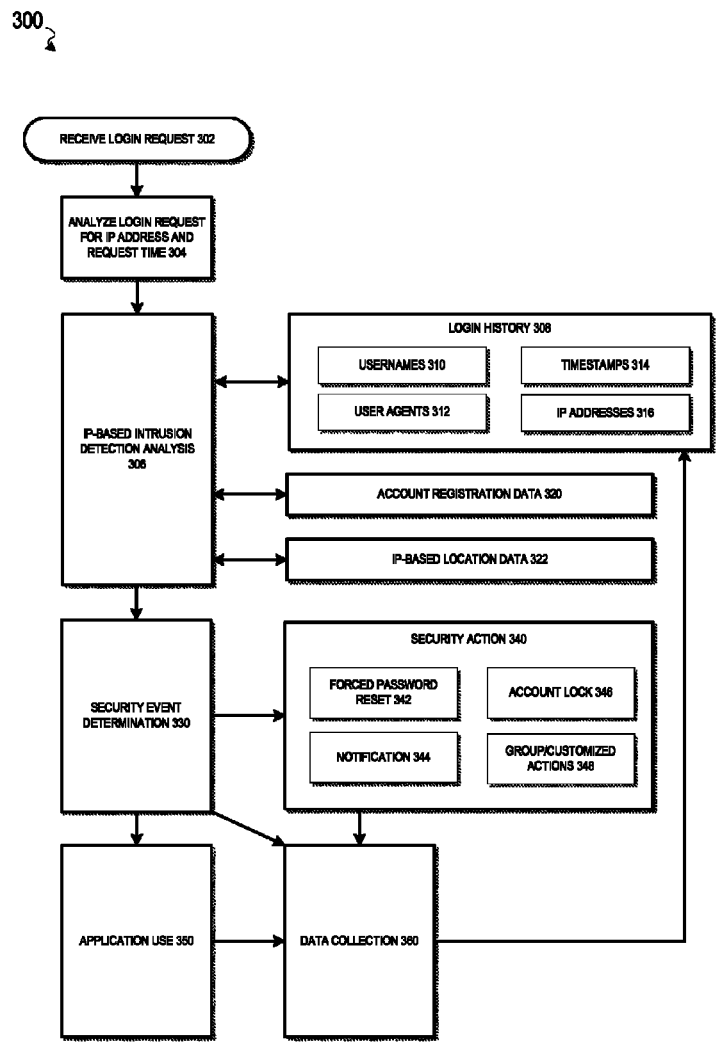
FIG. 3 is a diagram illustrating IP-based intrusion detection, according to some example embodiments.

FIG. 3 then illustrates another example embodiment shown as system operation 300. System operation 300 begins with operation 302, with a login request being received. In operation 304 the login request is analyzed to identify an IP address and request time associated with the login request. As described above, such operations may be performed by an interface module 140, a login module 162 of security modules 160, or any other such module of a system 130. This information is then passed to an analysis module such as analysis module 166 where IP based intrusion detection analysis is performed as part of operation 306.

Aspects of one embodiment of operation 306, IP based intrusion detection analysis, are described above with respect to method 200. As part of such a method, login history 308 data may be received by operation 306 for use in IP based intrusion detection analysis. This may include usernames 310, timestamps 314, and IP addresses 316 which identify previous login requests from the same IP address. Additionally, login history 308 may provide other information to operation 306 IP based intrusion detection analysis. Such information may include, for example, details of particular user agents 312 used in previous login instances. Such user agent 312 information may include device specific identifiers provided by a client device 110 or client application 112 in communication with a system 130. This may enable operation 306 IP based intrusion detection analysis to identify when a pattern of device use is consistent with an intrusion.

For example, if multiple different accounts have a history of being accessed from devices with different user agent values, and a set of login requests from the same IP address show a single user agent 312 being used for these different accounts, then IP based intrusion detection analysis operation 306 may use this as additional information in determining a security event.

Additionally, information from other sources other than login history 308 may be used. For example, account registration data 320 from a different source may be accessed. The separation of data may be used to provide different levels of privacy for system users 106. For example, account registration data 320 may be secured at a privacy level such that it is only accessed when an initial security event is suspected. Account registration data 320 may additionally contain contact information for users 106 or accounts that is outside of normal communication channels, and is therefore less likely to be compromised. Such account registration data 320 may then be used in security events described below.

Another independent source of information that may be used by operation 306 IP based intrusion detection analysis includes IP-based location data 322. In certain embodiments, different blocks of IP numbers are associated with different geographic locations. Login history 308 may include an older history of timestamp 314 and IP address information 316 that is outside of the time period associated with the current login request which is being analyzed. This information may include a pattern of IP address logins associated with the first geographic area. If a current IP address 316 is from a sufficiently distinct geographic area, this may act as an additional flag for operation 306 IP based intrusion detection analysis to determine that a security event is to be initiated.

Additional details related to operation 306, IP based intrusion detection analysis, are described below with respect to FIG. 5.

In operation 330, the analysis from the operation 306, IP based intrusion detection analysis, is passed to a security event determination operation 330. If the system determines that no security event is to be initiated, the login request results in a system access, and a user 106 may engage in operation 350 application use. In various embodiments, any application use 350 following a login request may be observed and used to generate data as part of data collection operation 360. This information may be stored in association with a login request as part of login history 308. In such embodiments, login history 308 includes not only information about a username 310, password, time stamps 314, and IP address 316 associated with the login, but also with system access and application use 350 following a login. In other embodiments, such data may be stored and collected separately from login history 308 in a separate database.

If, however, operation 330 results in initiation of a security event, then in operation 340, various different security actions may be taken. This includes a forced password reset in operation 342 and account lock in operation 346, or a simple notification in operation 344. In various embodiments, combinations of multiple such security actions 340 or all such security actions 340 may be taken in response to an IP based intrusion detection analysis 306 following a single login request. Additionally, when groups of accounts are analyzed as part of IP based intrusion detection analysis in operation 306, previous security events not identified when the actual login associated with the previous event occurred may be identified. In such situations as described in multiple different embodiments herein, a group security action 340 may be taken for all accounts associated with a username 310 that received a login request during the threshold time period. In such embodiments, combinations of group or customized actions may be taken in operation 348 to generate different sets of security actions 340 to different individual accounts or to groups of accounts. All such security actions in operation 340 may also be associated with data collection as part of data collection operation 360. Such data collection may be collected and sent to login history 308. Such data collection may also be used, in certain embodiments, to adjust threshold values used in IP based intrusion detection analysis of operation 306. For example, significant numbers of false positives or false negatives may be used to adjust threshold values automatically. Further still, certain patterns of security actions 340 over time may result not only in automated security actions related to a single account or groups of user accounts, but may also generate security actions 340 for operators of a system. This may include messaging to system operators, automated system shutdown related to excessive numbers of security actions 340 or security actions 340 within the time period.

Figure 4:
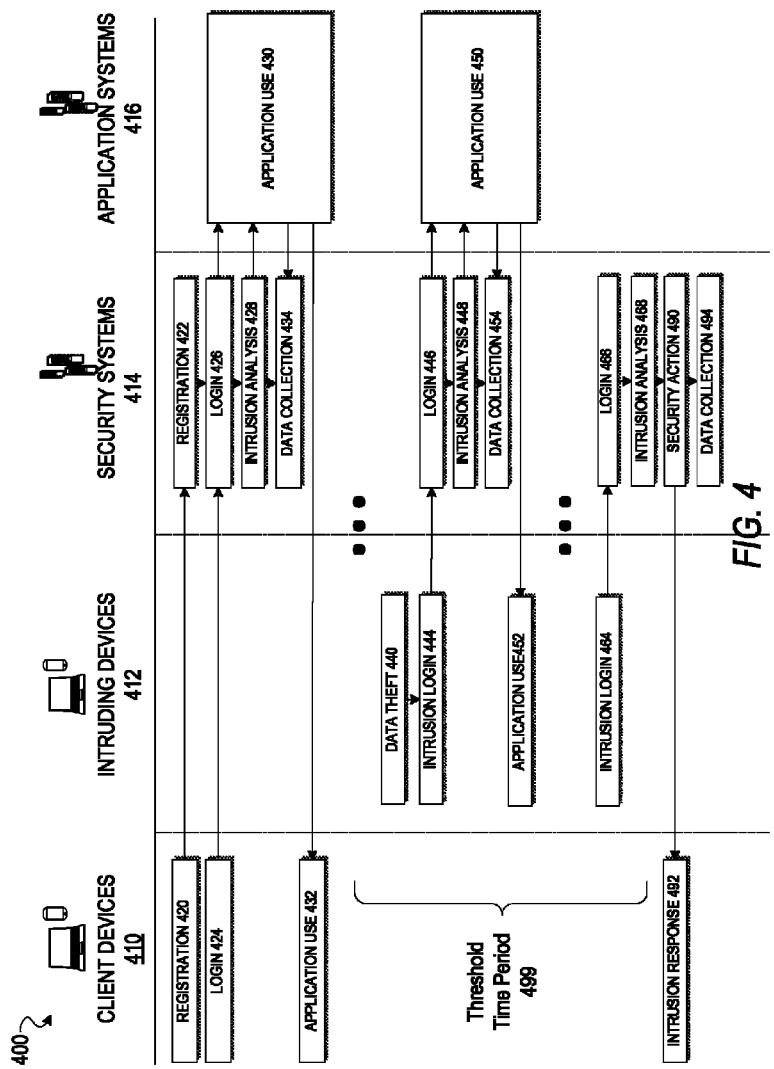
FIG. 4 is a diagram illustrating IP-based intrusion detection within a system of client, security, and application devices, according to some example embodiments.

FIG. 4 then illustrates an example of network level system operation 400, in accordance with some embodiments. Network level system operation 400 illustrates interactions between representative client devices 410, intrusion devices 412, security systems 414, and application systems 416. Client devices 410 may include any devices described herein. In certain embodiments, multiple different client devices 410 may be associated with a single account having a single username 310 and password. Intruding devices 412 may similarly be any type of computing device. As mentioned above, security system operation may attempt to distinguish between the types of authorized devices used as client devices 410 in typical operation versus intruding devices 412. For example, in certain embodiments, user agent identifiers may identify intruding devices 412 as being significantly higher power or otherwise different than typical client devices 410 associated with standard authorized access for typical users 106. For example, if communication headers or other information received by a system determines that intruding device 412 is a multi-processor desktop or server system, and the typical device 410 is a mobile phone or tablet, this power difference may be used as part of a decision to take a security action. Similarly, IP addresses 316 of authorized client devices 410 may follow certain location patterns that are different than IP address based locations for intruding devices 412. Communications from an out-of-pattern or unexpected IP address may be used as an input for a decision to take a security action.

Network level system operation 400 illustrates in operation beginning with a registration operation 422 and 420. Such a registration operation 420, 422 creates an account having a username 310 and password is described herein and is, by definition, a communication with an authorized user 106 for a particular account and username 310. Following the registration in operations 420 and 422, which may involve multiple communications back and forth between a client device 410 and a security system 414, authorized access may occur for a significant amount of time. Such authorized access includes a login operation shown as operations 424 and 426 involving communication between one or more client devices 410 and a security system 414. Each such login 424, 426 may involve an intrusion analysis operation 428, or such an intrusion analysis operation 428 may only be used for certain login operations 424, 426. While such authorized login operations 426 may involve false positive identifications of security events, threshold settings and other analysis aspects are set and may be adjusted to avoid such false positives and to enable authorized users 106 to follow login operation 426 with application use in operations 430 and 432. Data from intrusion analysis operations 428 and application use operations 430 will be stored as part of data collection operations 434.

Following registration 420, 422 and authorized system access in operations 420 through 432, a data theft operation 440 occurs. As described above, targeted data theft operations 440 particularly include an intruding device 412 gaining access to lists of usernames 310 and passwords from a third party source. Large sets of such data may include usernames 310 and passwords that are reused by users 106 across multiple systems. Intruding device 412 may use information from data theft 440 to perform intrusion login operations 444. This may include large numbers of automated login requests and system access operations as intruding device 412 tests different username 310 and password pairs retrieved from the third party source in data theft operation 440. Such tests of username 310 and password combinations result in repeated login operations 444 and 446, application use operations 450, and associated intrusion analysis operations 448 and data collection operations 454. In certain embodiments, intrusion analysis operation 448 may identify the like of application use operations 450 associated with repeated login 446 operations from a single IP address as a flag for a security event. As such, although network system operation 400 illustrates that each intrusion login operation 444 and login 446 is associated with an application use operation 450, such application use operation 450 may simply be a communication indicating a successful login 446 and access to applications 610, without further application use 540. In other embodiments, intruding device 412 may engage in significant application use 450 as part of an operation 452.

During threshold time period 499, it is expected that repeated intrusion login operations 444 and subsequent login operations 446, intrusion and analysis operations 448, application use operations 450, and data collection operations 454 will occur. Following such repeated operations by an intruding device 412 operating with a single IP address, an intrusion login operation 464 occurs. In login operation 466 and the associated intrusion analysis operation 468, history data from data collection operations 454 that occurred during threshold time period 499 are used by intrusion analysis operation 468 to identify a security event. When intrusion analysis operation 468 identifies a security event, a security action operation 490 occurs. This may involve any security action described above, including communications and actions requiring an intrusion response operation 492 from a client device 410. While this may be the same client device 410 that performed a particular registration operation 420 or log in operation 424, this may also be any other client device 410 identified by an account user 106 at any time, including an identified device that had not previously been used for communication with security systems 414 or application systems 416. Following a security action operation 490, application use 450 will be prevented, in many embodiments, and data collection operations 494 will occur.

Figure 5:
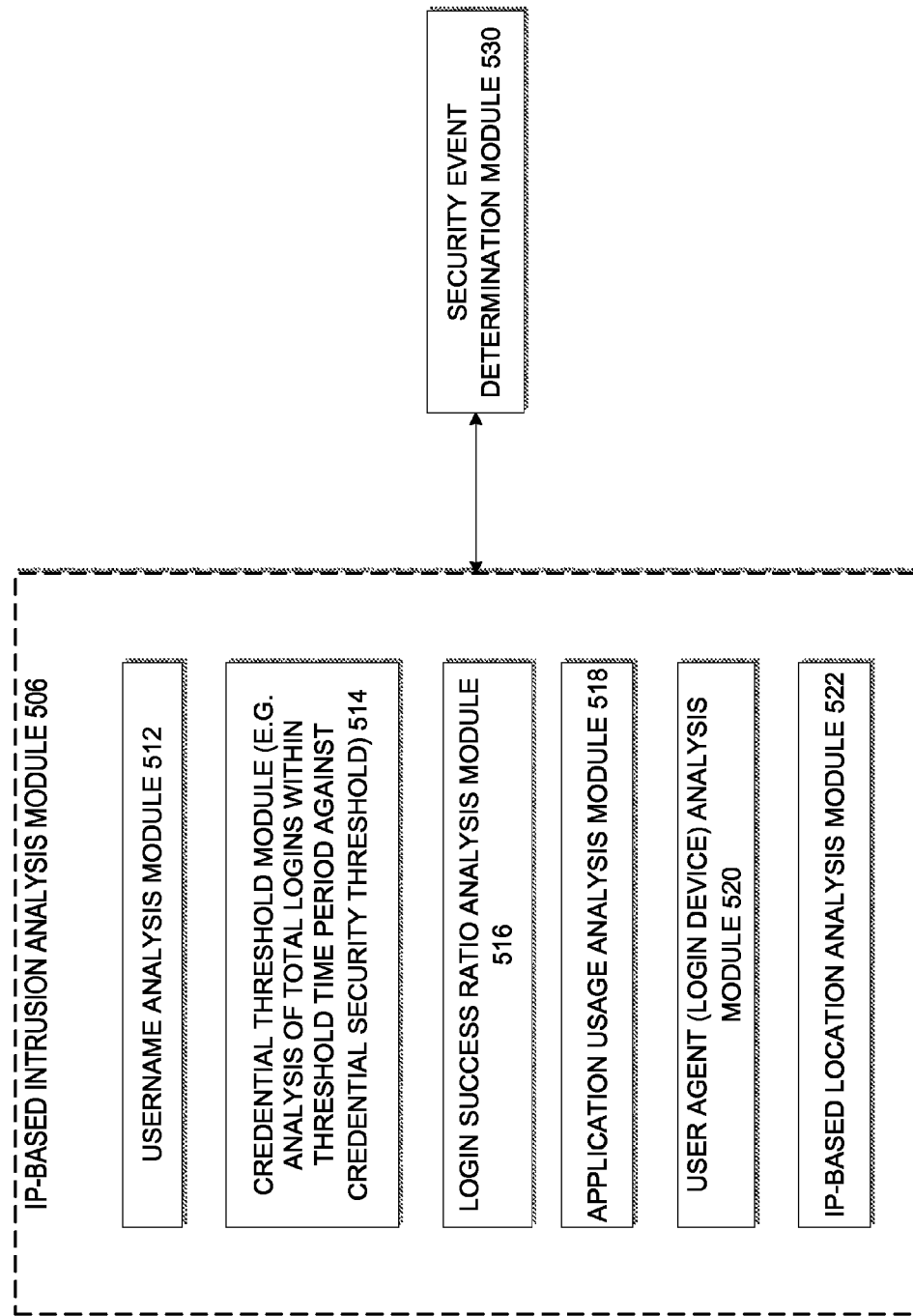
FIG. 5 illustrates aspects of IP-based intrusion analysis, according to some example embodiments.

FIG. 5 then describes an additional embodiment detailing IP-based intrusion analysis module 506. In various embodiments, any number of different intrusion triggers to identify a security event may be analyzed separately or jointly and be used in identifying a security event and selecting a corresponding security action 490. IP-based intrusion analysis module 506 includes a number of different such modules. As illustrated, the example embodiment of FIG. 5 includes username analysis module 512, credential threshold module 514, login success ratio analysis module 516, application usage analysis module 518, user agent analysis module 520, and IP-based location analysis module 522.

In certain embodiments, a username analysis module 512 includes logic or circuitry for determining when usernames from separate login requests 466 are within a threshold difference of each other, in order to identify potential username typos or recollection efforts by a single authorized user 106. In certain embodiments, credential threshold module pattern 514 includes logic or circuitry for gathering login history 308 information and counting the total number of logins 466 that have occurred within a threshold time period 499. In certain embodiments, login success ratio analysis module 516 includes logic or circuitry for comparing a total number of login requests 466 during a time period against the number of successful login requests 466 during the time period. In certain embodiments, application usage analysis module 518 analyzes application usage patterns following successful logins 466 in order to identify unauthorized intrusion logins 464 which are performed simply to verify the successful use of a particular set of login information. This may include identifying sequential logins 466 from a single IP address using different usernames 310 where application usage 450 is minimal. In certain embodiments, user agent analysis module 520 may include logic or circuitry to identify historical patterns of specific device usage associated with certain accounts, and to identify when a single device is used repeatedly to generate login requests 466 for different usernames 310 in an unexpected way. IP-based location analysis module 522 may include logic or circuitry for determining when an IP address associated with an unexpected location is used to request a login 466 for one or more accounts associated with previous login requests 446 from IP addresses 316 in a different geographic area. Various other embodiments of IP-based intrusion analysis modules 506 may include different combinations of elements including other analysis modules not listed here. In still further embodiments, the elements and modules listed here may be combined in multiple different ways including embodiments which exclude certain modules listed here.

Following operation of individual modules or combinations of modules working together as part of IP-based intrusion analysis module 506, analysis information may be passed to security event determination module 530. This information may be used to determine whether or not the system is identifying a security event. This information may also be used to identify different levels of security events. For example, certain security events may involve security actions 490 for a single user 106. Certain security events may involve a group security action 490 for users 106 that have accounts accessed from a single IP address within a threshold time period 499. Certain security events may involve multiple security actions 490 to different groups of users 106 including customized security actions for certain particular users 106, group actions to groups of users, and different combinations of different types of security actions 490 all in response to a single IP-based intrusion analysis determination.

As described above, group security actions may be based on an identification of groups of different accounts accessed from a single IP address during a particular time period. Such groups exist due to IP based intrusion detection relying on repeated attempts at unauthorized access using different usernames 310, with the repeated attempts not being identifiable by the system until multiple login attempts have been made. In various embodiments, security actions 490 for such groups may be modified by various account level security selections that may be part of registration operations 420, 422 for each account, or as part of account settings received from users 106 at any time during system operation 300. In certain embodiments, a system may determine that such settings have been modified following an unauthorized intrusion or a security event, and the system may base security actions 490 on previous account settings.

Modules, Components, and Logic

Certain embodiments such as security modules 160, analysis module 166, and IP-based intrusion analysis module 506 are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application 610 or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

As described herein, various client or mobile devices may be used which operate by executing an operating system (e.g., IOS™, ANDROID™ WINDOWS® Phone, or other mobile operating systems), consistent with some embodiments. In one embodiment, such a client or mobile device includes a touch screen operable to receive tactile data from a user 106. In various example embodiments, the client or mobile device displays a home screen (e.g., Springboard on IOS™) operable to launch applications 610 or otherwise manage various aspects of the device. In some example embodiments, the home screen provides status information such as battery life, connectivity, or other hardware statuses. The user 106 can activate user interface elements by touching an area occupied by a respective user interface element. In this manner, the user 106 interacts with the applications 610 of the device.

Many varieties of applications 610 (also referred to as "apps") can be executing on the device, such as native applications 610 (e.g., applications 610 programmed in Objective-C, Swift, or another suitable language running on IOS™ or applications 610 programmed in Java running on ANDROID™), mobile web applications 610 (e.g., applications 610 written in Hypertext Markup Language-5 (HTML5)), or hybrid applications 610 (e.g., a native shell application 610 that launches an HTML5 session). For example, a mobile device may include a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps) including any application 610 illustrated within architecture 602. In certain example embodiments, mobile devices include a social messaging app such as SNAPCHAT® that, consistent with some embodiments, allows users 106 to exchange ephemeral messages that include media content. In this example, the social messaging app can interact with server based security systems 414 to incorporate aspects of embodiments described herein.

Software Architecture

Figure 6:
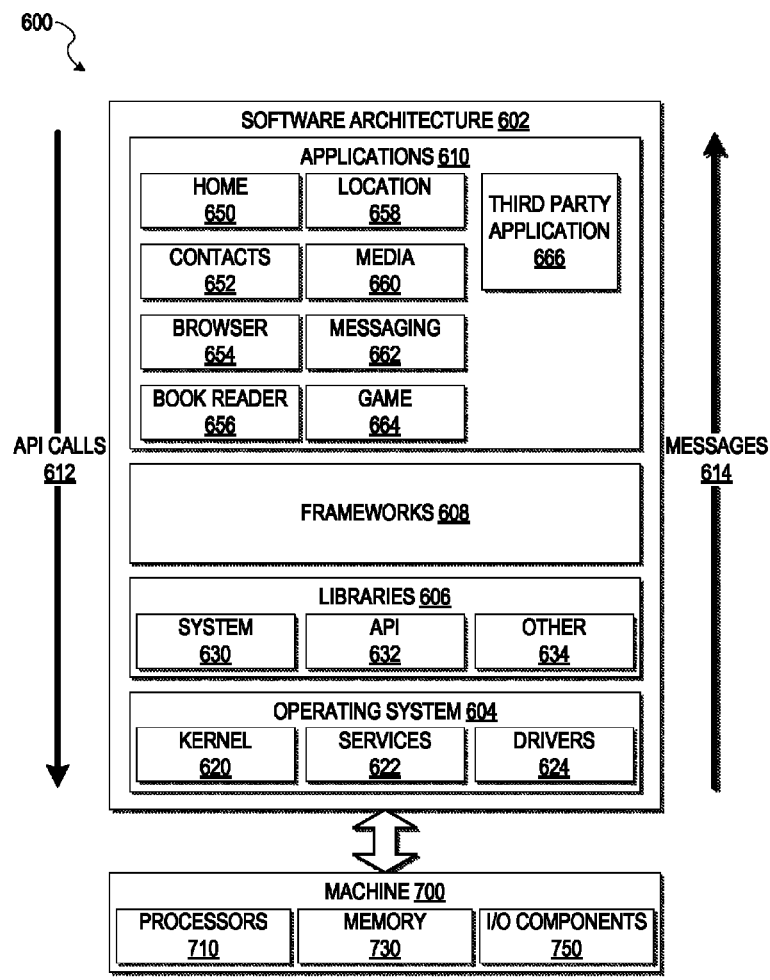
FIG. 6 is a block diagram illustrating an example of a software architecture that may be installed on a machine, according to some example embodiments.

FIG. 6 is a block diagram 600 illustrating an architecture of software 602, which can be installed on any one or more of the devices described above, including any device used to implement system 130, client device 110, or IP-based intrusion analysis module 506. FIG. 6 is merely a non-limiting example of a software architecture, and it will be appreciated that many other architectures can be implemented to facilitate the functionality described herein. In various embodiments, the software architecture 602 is implemented by hardware such as machine a 700 of FIG. 7 that includes processors 710, memory 730, and I/O components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory 730 management, processor 710 management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications 610 such as a third party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system 604 such as IOS™, ANDROID™, WINDOWS® Phone, or another mobile operating systems 604. In this example, the third party application 666 can invoke the API calls 612 provided by the operating system 604 to facilitate functionality described herein.

Example Machine Architecture and Machine-Readable Medium

Figure 7:
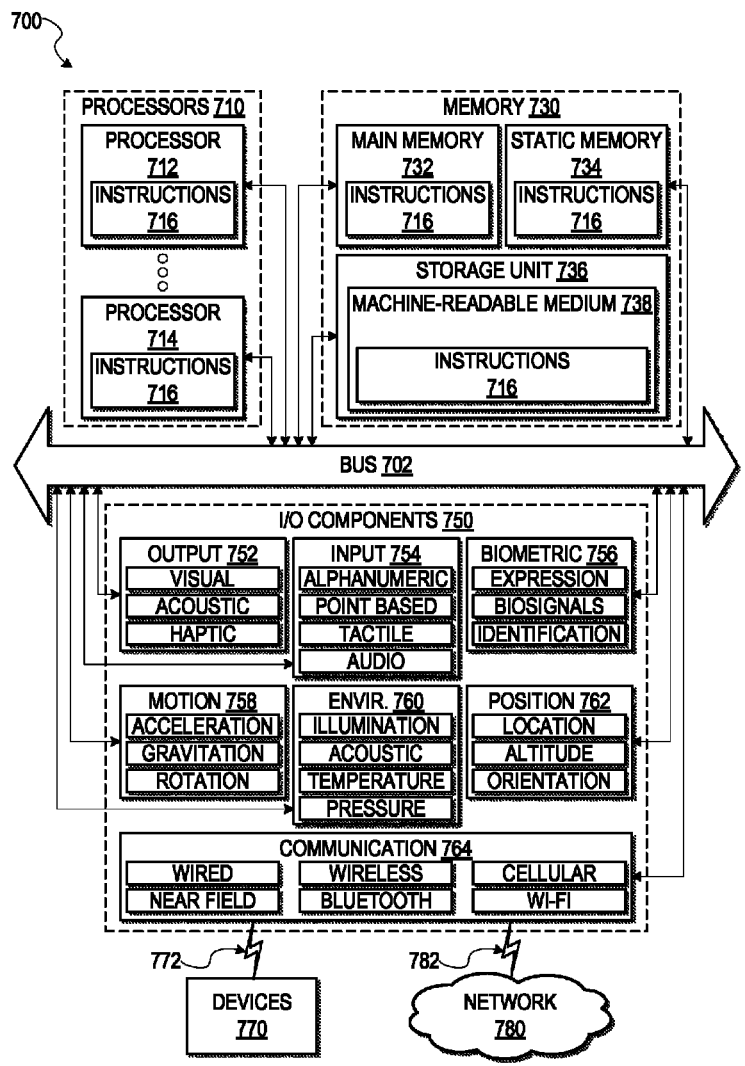
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 712, 714, the machine 700 may include a single processor 710 with a single core, a single processor 710 with multiple cores (e.g., a multi-core processor), multiple processors 710 with a single core, multiple processors 710 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a telephone service network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium should be considered as being transportable from one physical location to another. Additionally, since the machine-readable medium 738 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
 receiving, at a server computer, a first login request, the first login request comprising a username and a password;
 identifying a first internet protocol (IP) address and a first request time associated with the first login request;
 analyzing a login history comprising login request data for the server computer to identify a plurality of usernames, wherein each username of the plurality of usernames is associated with a corresponding login request from the first IP address within a threshold time period of the first request time;

determining that a total number of login requests from the first IP address within the threshold time period is above a credential security threshold;

determining that a number of usernames associated with the total number of login requests is above a username threshold;

comparing each username with each other username to determine a difference value for each username pair, wherein the difference value for each username pair comprises a sum of each character change, character addition, and character subtraction required to transform a first username of each username pair into a second username of each username pair; and for each username pair identified as similar usernames having a difference value less than a threshold difference value, counting the similar usernames as a single username for the number of usernames as compared to the username threshold;

determining that a login success ratio is below a threshold login success ratio after determining that the total number of login requests from the first IP address is above the credential security threshold; and in response to determining the login success ratio is below the threshold login success ratio and determining that the number of unique usernames is above the unique username threshold, automatically performing a security action using the server computer.

2. The method of claim 1 wherein the security action comprises communicating a security notification to an e-mail address associated with the username.

3. The method of claim 2 wherein the security action further comprises communicating the security notification to a corresponding e-mail address for each of the plurality of usernames.

4. The method of claim 1 wherein the security action comprises temporarily blocking accesses to an account associated with a username and automatically initiating a password reset process for the account.

5. The method of claim 4 wherein the security action further comprises temporarily blocking access to a plurality of accounts associated with each of the plurality of usernames and initiating the password reset process for each of the plurality of accounts.

6. The method of claim 1 wherein the security action further comprises:

identifying a plurality of accounts, wherein each account of the plurality of accounts is associated with a successful login from the IP address during the threshold time period.

7. The method of claim 6 wherein the security action further comprises:

identifying, for each account of the plurality of accounts, an associated set of user actions taken during the threshold time period; and initiating a custom security action for each account based on the associated set of user actions for each account.

8. The method of claim 7 wherein the security action further comprises:

determining a location associated with the IP address; and identifying, for each account of the plurality of accounts, a difference between the IP address and a registration IP address associated with a creation of each account;

wherein the custom security action for each account is further based on the difference between the IP address and the registration IP address associated with the creation of each account.

9. The method of claim 8 wherein the security action further comprises:

determining a total number of locations associated with registration of the plurality of usernames; and initiating a group security action for the plurality of usernames when the total number of locations is above a location threshold value.

10. The method of claim 6 wherein the security action further comprises:

identifying, for each successful login, a user agent value associated with a requesting client device;

identifying, for each account of the plurality of accounts from the login history, a user agent value history, associated with historical requesting client devices; and comparing, for each account, the user agent value and the user agent value history;

wherein the custom security action for each account is further based on the comparing of the user agent value and the user agent value history.

11. The method of claim 1 wherein counting the similar usernames as a single username comprises, for each username pair identified as similar usernames, subtracting one from the number of usernames prior to comparing the number of usernames to the username threshold.

12. A system comprising one or more server computers configured to:

receive a first login request, the first login request comprising a first username and a password;

identify a first internet protocol (IP) address and a first request time associated with the first login request;

analyze a login history comprising login request data for the server computer to identify a plurality of usernames, wherein each username of the plurality of usernames is associated with a corresponding login request from the first IP address within a threshold time period of the first request time;

determine that a total number of login requests from the first IP address within the threshold time period is above a credential security threshold;

determine a login success ratio is below a threshold login success ratio after determining that the total number of login requests from the first IP address is above the credential security threshold;

determine that a number of usernames associated with the total number of login requests is above a unique username threshold;

compare each username with each other username to determine a difference value for each username pair, wherein the difference value for each username pair comprises a sum of each character change, character addition, and character subtraction required to transform a first username of each username pair into a second username of each username pair; and for each username pair identifying similar usernames having a difference value less than a threshold difference value, counting the similar usernames as a single username for the number of usernames when comparing to the username threshold;

and in response to determining that the login success ratio is below the threshold login success ratio and determining that the number of unique usernames is above the unique username threshold, automatically perform a security action using the server computer.

13. The system of claim 12 wherein the one or more server computers are further configured to:
    compare the first username with each username of the plurality of usernames to identify a set of similar usernames; and
    merge a set of login requests associated with the set of similar usernames into a merged login request in the login history.

14. The system of claim 13 wherein identifying the set of similar usernames comprises determining that each username of the set of similar usernames is within a threshold number of character changes of the first username.

15. The system of claim 14 wherein the one or more server computers are further configured to:
    identify a plurality of accounts, wherein each account of the plurality of accounts is associated with a successful login from the IP address during the threshold time period;
    identify, for each account of the plurality of accounts, an associated set of user actions taken during the threshold time period;
    determine a location associated with the IP address;
    identify, for each account of the plurality of accounts, a difference between the IP address and a registration IP address associated with a creation of each account, wherein the custom security action for each account is further based on the difference between the IP address and the registration IP address associated with the creation of each account;
    determine a total number of locations associated with registration of the plurality of usernames;
    identify, for each successful login, a user agent value associating with a requesting client device; and
    identify, for each account of the plurality of accounts from the login history, a user agent value history, associated with historical requesting client devices.

16. The system of claim 15 wherein automatically performing a security action using the server computer comprises, for each corresponding account of the plurality of accounts and based on the user agent value, registration IP address, the total number of locations associated with registration of the plurality of usernames, selecting one or more of:
    blocking access to the corresponding account;
    initiating a password reset for the corresponding account;
    communicating a security notification to an e-mail address associated with the corresponding account; and
    updating the login history with a security indicator.

17. The system of claim 12 further comprising a registration server computer configured to:
    receive a registration request from a first client device;
    communicate a security notification to the first client device requesting permission to store tracking information associated with the first client device;
    receive a security notification response; and
    in response to the security notification response, storing a registration IP address and a user agent value associated with the client device in a login history database comprising the login history.

18. A non-transitory computer readable medium comprising computer readable instructions that, when executed by one or more processors, cause one or more server computers to:
    receive a first login request, the first login request comprising a username and a password;
    identify a first internet protocol (IP) address and a first request time associated with the first login request;
    analyze a login history comprising login request data for the server computer to identify a plurality of usernames, wherein each username of the plurality of usernames is associated with a corresponding login request from the first IP address within a threshold time period of the first request time;
    set a first security flag in response to a determination that a total number of login requests from the first IP address within a threshold time period is above the credential security threshold;
    set a second security flag in response to a second determination that a number of usernames associated with the total number of login requests is above a username threshold;
    compare each username with each other username to determine a difference value for each username pair, wherein the difference value for each username pair comprises a sum of each character change, character addition, and character subtraction required to transform a first username of each username pair into a second username of each username pair; and
    for each username pair identified as similar usernames having a difference value less than a threshold difference value, count the similar usernames as a single username for the number of usernames as comparing to the username threshold;
    and
    automatically initiate a security action in response to the first security flag and the second security flag.

19. The non-transitory computer readable medium of claim 18 wherein the instructions further cause the one or more server computers to determine that a login success ratio is below a threshold login success ratio after determining that the total number of login requests from the first IP address is above the credential security threshold;
    wherein the security action is further based on the determination that the login success ratio is below the threshold login success ratio.

* * * * *